US010719612B2

(12) United States Patent
Stopel et al.

(10) Patent No.: US 10,719,612 B2
(45) Date of Patent: *Jul. 21, 2020

(54) STATIC DETECTION OF VULNERABILITIES IN BASE IMAGES OF SOFTWARE CONTAINERS

(71) Applicant: Twistlock, Ltd., Herzliya (IL)

(72) Inventors: Dima Stopel, Herzliya (IL); Ben Bernstein, San Francisco, CA (US)

(73) Assignee: Twistlock, Ltd., Herzliya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/222,180

(22) Filed: Dec. 17, 2018

(65) Prior Publication Data
US 2019/0121986 A1 Apr. 25, 2019

Related U.S. Application Data

(63) Continuation of application No. 15/292,915, filed on Oct. 13, 2016, now Pat. No. 10,223,534.

(60) Provisional application No. 62/241,812, filed on Oct. 15, 2015.

(51) Int. Cl.
G06F 21/00 (2013.01)
G06F 21/57 (2013.01)
(52) U.S. Cl.
CPC ...... *G06F 21/577* (2013.01); *G06F 2221/033* (2013.01)
(58) Field of Classification Search
None
See application file for complete search history.

(56) References Cited

U.S. PATENT DOCUMENTS

| 6,490,620 | B1 | 12/2002 | Ditmer et al. |
| 6,502,102 | B1 | 12/2002 | Haswell et al. |
| 6,523,027 | B1 | 2/2003 | Underwood |
| 6,704,873 | B1 | 3/2004 | Underwood |
| 6,732,162 | B1 | 5/2004 | Wood et al. |
| 7,100,195 | B1 | 8/2006 | Underwood |
| 7,103,740 | B1 | 9/2006 | Colgrove et al. |
| 7,577,848 | B2 * | 8/2009 | Schwartz ............... G06F 21/52 711/216 |

(Continued)

OTHER PUBLICATIONS

Linn, et al., "Protecting Against Unexpected System Calls", Department of Computer Science, University of Arizona, Tucson, AZ, 2005, url: https://www.usenix.org/legacy/events/sec05/tech/linn.html, pp. 239-254.

(Continued)

*Primary Examiner* — Maung T Lwin
(74) *Attorney, Agent, or Firm* — M&B IP Analysts, LLC

(57) ABSTRACT

A system and method for detecting vulnerabilities in be images of software containers are disclosed. The method includes receiving an event indicating that at least one base image should be scanned for vulnerabilities, each base image including at least one image layer, wherein the event designates at least one source of the at least one base image, wherein the least one base image includes resources utilized to execute at least a software container; extracting contents of each image layer of each base image; scanning the extracting contents to detect at least one vulnerability; and generating a detection event, when the at least one vulnerability is detected.

19 Claims, 6 Drawing Sheets

(56) References Cited

U.S. PATENT DOCUMENTS

| | | | |
|---|---|---|---|
| 7,596,227 B2 | 9/2009 | Illowsky et al. | |
| 7,640,235 B2 | 12/2009 | Shulman et al. | |
| 7,698,741 B2 | 4/2010 | Marinescu et al. | |
| 7,743,420 B2 | 6/2010 | Shulman et al. | |
| 7,752,662 B2 | 7/2010 | Shulman et al. | |
| 7,752,669 B2 | 7/2010 | Palliyil et al. | |
| 7,779,468 B1 | 8/2010 | Magdych et al. | |
| 7,861,303 B2 | 12/2010 | Kouznetsov et al. | |
| 7,882,542 B2 | 2/2011 | Neystadt et al. | |
| 8,024,804 B2 | 9/2011 | Shulman et al. | |
| 8,051,484 B2 | 11/2011 | Shulman et al. | |
| 8,056,141 B2 | 11/2011 | Shulman et al. | |
| 8,108,933 B2 | 1/2012 | Mahaffey | |
| 8,135,948 B2 | 3/2012 | Shulman et al. | |
| 8,181,246 B2 | 5/2012 | Shulman et al. | |
| 8,302,192 B1 | 10/2012 | Cnudde et al. | |
| 8,316,237 B1 | 11/2012 | Felsher et al. | |
| 8,499,150 B1 | 7/2013 | Nachenberg | |
| 8,510,571 B1 | 8/2013 | Chang et al. | |
| 8,621,613 B1 | 12/2013 | McClintock et al. | |
| 8,639,625 B1 | 1/2014 | Ginter et al. | |
| 8,677,472 B1 | 3/2014 | Dotan et al. | |
| 8,756,683 B2 | 6/2014 | Manion et al. | |
| 8,806,625 B1* | 8/2014 | Berger | H04L 9/3236 711/118 |
| 8,966,629 B2 | 2/2015 | Sallam | |
| 9,003,141 B2 | 4/2015 | Nielsen et al. | |
| 9,098,333 B1 | 8/2015 | Obrecht et al. | |
| 9,203,862 B1 | 12/2015 | Kashyap et al. | |
| 9,223,966 B1 | 12/2015 | Satish et al. | |
| 9,256,467 B1* | 2/2016 | Singh | G06F 9/5077 |
| 9,355,248 B1* | 5/2016 | Wiest | G06F 21/55 |
| 9,401,922 B1 | 7/2016 | Walters | |
| 9,594,590 B2 | 3/2017 | Hsu | |
| 9,904,781 B2 | 2/2018 | Martini et al. | |
| 9,928,379 B1 | 3/2018 | Hoffer | |
| 10,223,534 B2* | 3/2019 | Stopel | G06F 21/577 |
| 10,333,967 B2 | 6/2019 | Litva et al. | |
| 2001/0007131 A1 | 7/2001 | Galasso et al. | |
| 2003/0014629 A1 | 1/2003 | Zuccherato | |
| 2003/0079145 A1 | 4/2003 | Kouznetsov et al. | |
| 2003/0120593 A1 | 6/2003 | Bansal et al. | |
| 2003/0229801 A1 | 12/2003 | Kouznetsov et al. | |
| 2003/0233566 A1 | 12/2003 | Kouznetsov et al. | |
| 2003/0233574 A1 | 12/2003 | Kouznetsov et al. | |
| 2004/0133793 A1 | 7/2004 | Ginter et al. | |
| 2005/0120054 A1 | 6/2005 | Shulman et al. | |
| 2005/0177715 A1 | 8/2005 | Somin et al. | |
| 2006/0075494 A1 | 4/2006 | Bertman et al. | |
| 2006/0230451 A1 | 10/2006 | Kramer et al. | |
| 2006/0282664 A1 | 12/2006 | Zhao | |
| 2006/0288420 A1 | 12/2006 | Mantripragada et al. | |
| 2007/0112714 A1 | 5/2007 | Fairweather | |
| 2007/0130621 A1 | 6/2007 | Marinescu et al. | |
| 2007/0136282 A1 | 6/2007 | Takashima | |
| 2007/0174630 A1 | 7/2007 | Shannon et al. | |
| 2007/0240218 A1 | 10/2007 | Tuvell et al. | |
| 2007/0240220 A1 | 10/2007 | Tuvell et al. | |
| 2007/0240221 A1 | 10/2007 | Tuvell et al. | |
| 2007/0240222 A1 | 10/2007 | Tuvell et al. | |
| 2008/0086773 A1 | 4/2008 | Tuvell et al. | |
| 2008/0134177 A1 | 6/2008 | Fitzgerald et al. | |
| 2008/0168135 A1 | 7/2008 | Redlich et al. | |
| 2008/0177994 A1 | 7/2008 | Mayer | |
| 2008/0196104 A1 | 8/2008 | Tuvell et al. | |
| 2009/0144823 A1 | 6/2009 | Lamastra et al. | |
| 2009/0217260 A1 | 8/2009 | Gebhart et al. | |
| 2009/0319796 A1 | 12/2009 | Kim et al. | |
| 2010/0011029 A1 | 1/2010 | Niemela | |
| 2011/0116637 A1 | 5/2011 | Schiefelbein | |
| 2011/0179484 A1 | 7/2011 | Tuvell et al. | |
| 2011/0258701 A1 | 10/2011 | Cruz et al. | |
| 2011/0314542 A1 | 12/2011 | Viswanathan et al. | |
| 2011/0314548 A1 | 12/2011 | Yoo | |
| 2011/0321139 A1 | 12/2011 | Jayaraman et al. | |
| 2012/0008529 A1 | 1/2012 | Averbuch et al. | |
| 2012/0023584 A1 | 1/2012 | Yoo | |
| 2012/0036572 A1 | 2/2012 | Yoo | |
| 2012/0042375 A1 | 2/2012 | Yoo | |
| 2012/0117203 A1 | 5/2012 | Taylor et al. | |
| 2013/0073388 A1 | 3/2013 | Heath | |
| 2014/0059226 A1 | 2/2014 | Messerli et al. | |
| 2014/0181894 A1 | 6/2014 | Bokern et al. | |
| 2014/0237550 A1 | 8/2014 | Anderson et al. | |
| 2014/0283071 A1 | 9/2014 | Spikes | |
| 2014/0337234 A1 | 11/2014 | Tang et al. | |
| 2015/0156183 A1 | 6/2015 | Beyer et al. | |
| 2015/0178497 A1 | 6/2015 | Lukacs et al. | |
| 2015/0220735 A1 | 8/2015 | Paithane et al. | |
| 2015/0271139 A1 | 9/2015 | Lukacs et al. | |
| 2015/0332043 A1 | 11/2015 | Russello | |
| 2015/0379287 A1 | 12/2015 | Mathur et al. | |
| 2016/0323315 A1 | 11/2016 | Hathaway et al. | |
| 2017/0063557 A1 | 3/2017 | Chalmandrier-Perna | |
| 2017/0068676 A1 | 3/2017 | Jayachandran et al. | |
| 2017/0177877 A1 | 6/2017 | Suarez et al. | |
| 2017/0244748 A1 | 8/2017 | Krause et al. | |

OTHER PUBLICATIONS

Kovatsch, et al., "A RESTful Runtime Container for Scriptable Internet of Things Applications", 3rd IEEE International Conference on the Internet of Things, Oct. 2012.

Mattetti, et. al., "Securing the Infrastructure and the Workloads of Linux Containers", IEEE Conference on Communications and Network Security (CNS), 2015.

Pan, el al., Robust Container Code Recognition System, Fifth World Congress on Intelligent Control and Automation, 2004.

Cziva, et al., "Container-based Network Function Virtualization for Software-Defined Networks," 2015 IEEE Symposium on Computers and Communication (ISCC), pp. 415-420, Scotland.

Dhakchianandan, et al., "Memory Efficacious Pattern Matching Intrusion Detection System", 2013 International Conference on Recent Trends in Information Technology (ICRTIT), pp. 652-656, Anna University, Chennai, India.

Guenane, et al, "Autonomous Architecture for Managing Firewalling Cloud-Based Service," 2014 International Conference and Workshop on the Network of the Future (NOF), Paris, France, pp. 1-5.

Rehak, et al., "Adaptive Multiagent System for Network Traffic Monitoring," IEEE Intelligent Systems, vol. 24, Issue: 3, 2009, Czechia, pp. 17-25.

Shouman, et al., "Surviving Cyber Warfare With a Hybrid Multiagent-based Intrusion Prevention System," IEEE Potentials, vol. 29, Issue: 1, 2010, pp. 32-40.

Song, et al., "A Control Theoretical Approach for Flow Control to Mitigate Bandwidth Attacks," 2006 IEEE Information Assurance Workshop, West Point, NY, pp. 348-360.

Van Niekerk, et al., "Cloud-Based Security Mechanisms for Critical Information Infrastructure Protection," 2013 International Conference on Adaptive Science and Technology, South Africa, pp. 1-4.

Wang, et al., "Transport-Aware IP Routers: A Built-in Protection Mechanism to Counter DDoS Attacks," IEEE Transactions on Parallel and Distributed Systems, vol. 14, Issue: 9, pp. 873-884, Sep. 2003.

Zhauniarovich, et al., "MOSES: Supporting and Enforcing Security Profiles on Smartphones," IEEE Transactions on Dependable and Secure Computing, vol. 11, Issue: 3, pp. 211-223, 2014.

Azkia, et al., "Reconciling IHE-ATNA Profile with a posteriori Contextual Access and Usage Control Policy in Healthcare Environment", 2010 Sixth International Conference on Information Assurance and Security, 2010 IEEE, pp. 197-203, Cesson, Sevigne, France.

Balazsi, et al., "Software System for Broadcasting and Monitoring Traffic Information", 2014 IEEE 12th International Symposium on Intelligent Systems and Informatics (SISY), 2014, pp. 39-42, Subotica, Serbia.

Cooper, et al., "Internet X.509 Public Key Infrastructure Certificate and Certificate Revocation List (CRL) Profile", May 2008, pp. 151.

(56) References Cited

OTHER PUBLICATIONS

Housley, et. al., "Internet X 509 Public Key Infrastructure Certificate and Certificate Revocation List (CRL) Profile", Apr. 2002, pp. 259.
Jing, et al., "A Context-aware Disaster Response System Using Mobile Software Technologies and Collaborative Filtering Approach", 2014 IEEE 18th International Conference on Computer Supported Cooperative Work in Design, 2014, pp. 516-522, China.
Schneier, Bruce., "Economics of Information Security and Privacy III", 2013, pp. 73-109.
Skillen, et al., "Mobiflage: Deniable Storage Encryption for Mobile Devices," IEEE Transaction on Dependable and Secure Computing, vol. 11, No. 3, May-Jun. 2014, 2013 IEEE, pp. 224-237, Canada.

* cited by examiner

STATIC DETECTION OF VULNERABILITIES IN BASE IMAGES OF SOFTWARE CONTAINERS

CROSS-REFERENCE TO RELATED APPLICATIONS

This application is a continuation of U.S. patent application Ser. No. 15/292,915 filed on Oct. 13, 2016, now allowed, which claims priority from U.S. Provisional Patent Application No. 62/241,812 filed on Oct. 15, 2015. The contents of the above-referenced applications are hereby incorporated by reference.

TECHNICAL FIELD

The present disclosure generally relates to cybersecurity systems, and more particularly to detection of malicious code and activity in image software containers.

BACKGROUND

A software container is an instance of a user-space running an application within the operating system (OS) of a host device (e.g., a server). Software containers enable operating-system-level virtualization in which the OS kernel allows the existence of multiple isolated software containers.

A software container (also known as a container) provides an executable environment with a complete filesystem. The filesystem may contain code, runtime, system tools, system libraries, and so on. That is, execution of a software container can be the same regardless of the underlying infrastructure. A Docker is one of the popular existing platforms for creating, migrating, managing, and deploying software containers.

A software container, unlike a virtual machine, does not require or include a separate operating system. Rather, the container relies on the kernel's functionality and uses hardware resources (CPU, memory, I/O, network, etc.) and separate namespaces to isolate the application's view of the operating system. A software container can access the OS kernel's virtualization features either directly or indirectly. For example, Linux® Kernel can be accessed directly using the libcontainer library or indirectly using the libvirt service.

As demonstrated in FIG. 1, a number of software containers (i.e., the app containers 110-1 through 110-n, hereinafter referred to individually as a container 110, merely for simplicity purposes) can access and share the same OS kernel 120. However, each container 110 can be constrained to only use a defined amount of hardware resources (e.g., CPU, memory, etc.) in the underlying hardware layer 130. Thus, using software containers, hardware resources can be isolated, services can be restricted, and processes can be provisioned to have an almost completely private view of the operating system with their own process ID space, file system structure, and network interfaces.

FIG. 2 illustrates a typical structure of a software container 200. The software container 200 includes a base image 210 and a container layer 220. The base image 210 includes one or more image layers 215-1 through 215-q (hereinafter referred to individually as a layer 215 and collectively as layers 215, merely for simplicity purposes). The layers 215 are read-only layers that represent filesystem differences. That is, the layers 215 are stacked on top of each other to form a base for the container's 200 root filesystem. The layers 215 are read only, and each layer 215 is identified by a randomly generated identifier number of a checksum computed using a hash function.

The base image 210 (and its layers 215) can be shared across different software containers. Thus, only the container layer 220, which is the top layer, differentiates between one software container and another. The container layer 220 is a readable and writable layer where all data written to the software container 200 are saved in the container layer 220. When the software container 200 is deleted, the writable container layer 220 is also deleted, and the base image 210 remains unchanged. As such, the multiple software containers 200 can share access to the same base image 210, each of which has its own data state. In the example demonstrated in FIG. 2, the software container 200 is a Docker container (e.g., compliant with the Docker platform).

The popularity of software containers has been increased due to the easy integration with cloud-computing platforms (e.g., Amazon® Web Services, Google® Cloud Platform, Microsoft® Azure, etc.). On such platforms, service providers can offer operating systems to run services and applications. With that said, the increasing reliance on software containers increases the need for secured execution.

Base images are typically uploaded and stored in third-party image registries and usually are not operated directly by an organization. Further, the images are used across many containers. As such, images can be developed and uploaded to image registries by programmers who are associated with the organization seeking to use the image. Therefore, hackers can take advantage and program images to include malicious code, thus such images can be vulnerable when integrated in a software container. Such malicious code may carry any type of malware including, for example, computer viruses, worms, Trojan horses, ransomware, spyware, adware, scareware, and the like. Further such malicious code may be a source for an ATP attack or a distributed DoS (DDoS) attack when a software container is executed with an infected or malicious image.

Typically, a software container (and, thus, each application) can be secured separately from other software containers (and applications). Thus, one software container cannot access resources of other software containers. However, the isolation of software containers cannot prevent the execution of malicious code. Malicious activity by software containers can occur through exploitation of legitimate programs or services in a container and improper configuration. Improper configuration may result in, for example, privilege escalations. Detection of such vulnerabilities occurs only at runtime, i.e., during the execution of the software containers.

To prevent integration of malicious images in a software container, detection of vulnerabilities in images should occur prior to the execution of the software container. Preferably, such vulnerabilities should be checked when images are uploaded to the image registries.

Existing security solutions are not designed to detect vulnerabilities in images of software containers. Specifically, images have a specific structure that cannot be processed by existing security solutions. For example, a conventional antivirus tool cannot scan images to detect computer viruses, as such a tool cannot extract the different layers of an image and cannot parse each layer to analyze its contents.

In addition, currently there is no security tool that can check for vulnerabilities in base images, as such images are uploaded to a registry (e.g., during a continuous integration process). This is a major drawback, as there is no defense preventing registries from including malicious code embedded therein.

It would be therefore advantageous to provide a solution that would secure base images of software containers and image registries.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Certain embodiments disclosed herein include a method for detecting vulnerabilities in base images of software containers. The method comprises receiving an event indicating that at least one base image should be scanned for vulnerabilities, each base image including at least one image layer, wherein the event designates at least one source of the at least one base image, wherein the least one base image includes resources utilized to execute at least a software container; extracting contents of each image layer of each base image; scanning the extracting contents to detect at least one vulnerability; and generating a detection event, when the at least one vulnerability is detected.

Certain embodiments disclosed herein include a host device for detecting vulnerabilities in software containers at runtime. The host device comprises a processing system; and a memory, the memory containing instructions that, when executed by the processing system, configure the host device to: receive an event indicating that at least one base image should be scanned for vulnerabilities, each base image including at least one image layer, wherein the event designates at least one source of the at least one base image, wherein the least one base image includes resources utilized to execute at least a software container; extract contents of each image layer of each base image; scan the extracting contents to detect at least one vulnerability; and generate a detection event, when the at least one vulnerability is detected.

BRIEF DESCRIPTION OF THE DRAWINGS

The subject matter disclosed herein is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

Figure 1:
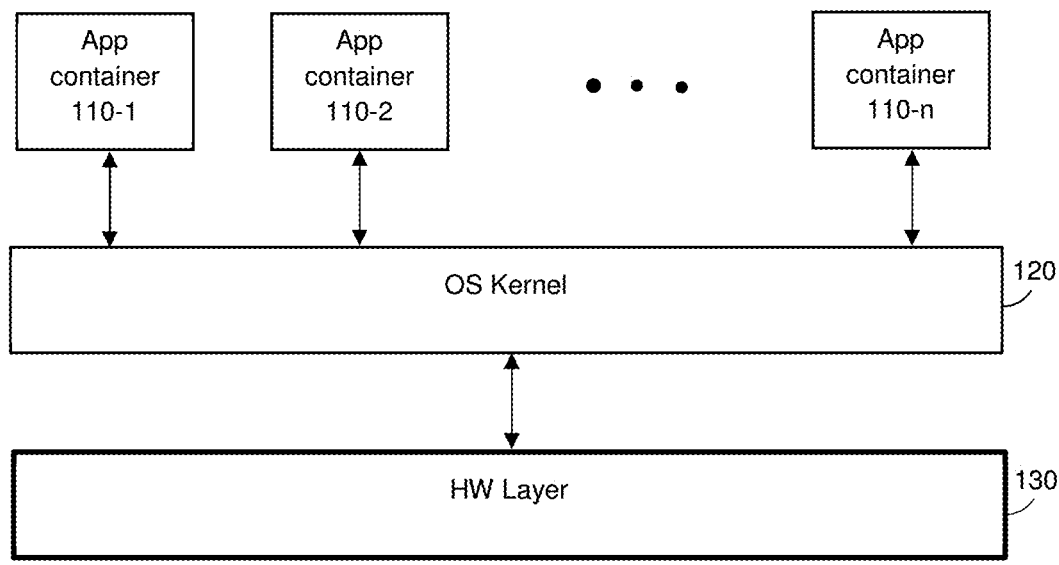
FIG. 1 is a diagram illustrating of execution of a plurality of software containers.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

By way of example, the various disclosed embodiments include techniques for detecting vulnerabilities in base images of software containers prior to runtime. The detected vulnerabilities include at least known malwares or zero-day malware. In an embodiment, detection of vulnerabilities is performed in image registries prior to integration of a base image in a software container, thereby preventing execution of software containers that include malicious code embedded in an image container. In another embodiment, scanning for vulnerabilities is performed only on images' layers that have not been previously scanned.

Figure 3:
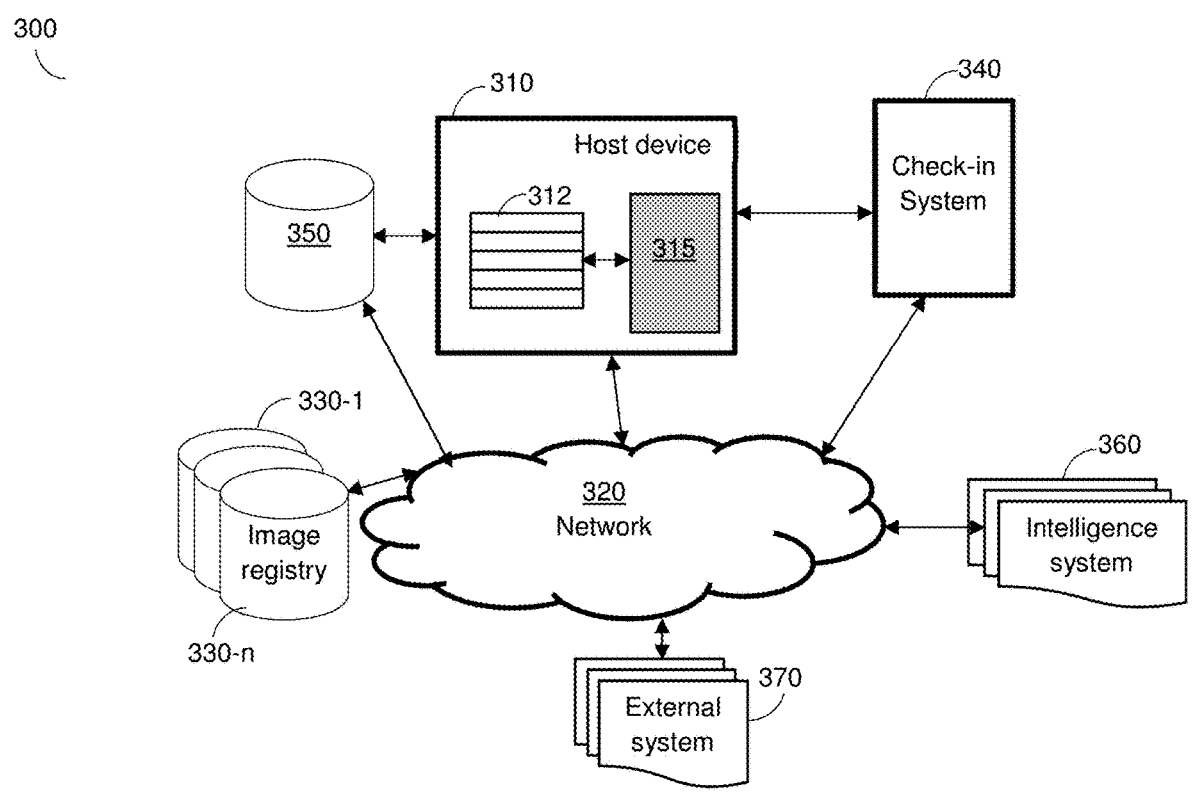
FIG. 3 is a network diagram utilized to describe the various disclosed embodiments.

FIG. 3 is an example network diagram 300 utilized to describe the various embodiments for detection of vulnerabilities in base images of software containers. The detection of vulnerabilities is performed prior to execution of a software container.

As shown in FIG. 3, a host device 310 is communicably connected to a network 320. The host device 310 can be realized as a physical machine, a virtual machine, or a cloud infrastructure (IaaS). Examples for such a cloud infrastructure include, but are not limited to, Amazon Web Services (AWS), Cisco® Metapod, Microsoft Azure®, Google® Compute Engine (GCE), Joyent®, and the like. The host device 310 may be deployed in a datacenter, a cloud computing platform (e.g., a public cloud, a private cloud, or a hybrid cloud), on-premises of an organization, or in a combination thereof. The network 320 may be the Internet, the world-wide-web (WWW), a local area network (LAN), a wide area network (WAN), a metro area network (MAN), and other networks.

Figure 2:
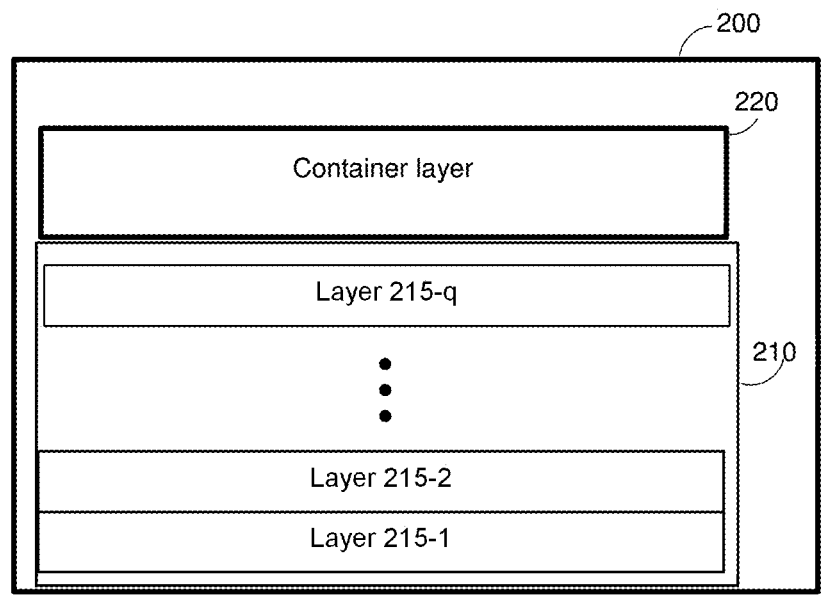
FIG. 2 is a diagram illustrating a structure of a software container.

Also connected to the network 320 is one or more image registries 330-1 through 330-$n$ (collectively referred to hereinafter as image registries 330 or individually as an image registry 330, merely for simplicity purposes). Each image registry 330 stores base images (not shown) that can be accessed or otherwise downloaded to the host device 310. An example structure of a base image is shown in FIG. 2. In certain configurations, base images can be locally stored at the host device 310.

An image registry 330 may be, but is not limited to, Docker Hub, Google Container Registry, Amazon EC2 Container Registry, Artifactory, and the like. The image registry 330 is a data repository that allows program images and test them, store manually pushed images, and link to software containers repositories. An image registry 330 typically provides a centralized resource for discovery, distribution, management, and collaboration of base images. An image registry 330 may be a cloud-based registry service or may be on-premises.

According to the disclosed embodiments, the host device 310 is configured to host and execute a detector container 315. The detector container 315 is a software container designed to detect vulnerabilities in any base images stored in the image registry 330 or locally in the host 310.

In an embodiment, the host device 310 (and the detector container 315) are configured to interface with a continuous integration (CI) system 340. Typically, the CI system 340 allows for building, testing, and uploading of an image to the image registry 330. Examples for such a CI system 340 include Jenkins®, Appveyor®, TeamCity, Bamboo, and the like. In an example embodiment, the interface between the host device 310 and the system may be realized as an API or a plugin. The host device 310 may be also communicatively connected to a database 350 for storing at least results from pervious scans.

According to some embodiments, the host device 310 is communicatively connected to one or more intelligence systems 360 through the network 320. The intelligence systems 360 may include common vulnerabilities and exposures (CVE®) databases, reputation services, security systems (providing feeds on discovered threats), and so on. The information provided by the intelligence systems 360 is utilized to detect certain vulnerabilities in the base images stored in the registries 330.

In an optional deployment, the host device 310 may be communicatively connected to one or more external systems 370 through the network 320. Examples for such systems 370 may include, but are not limited to, an active directory of an organization to retrieve user permissions, access control systems (e.g., Docker Swarm, and Kubernetes management plane), SIEM systems to report on detected vulnerabilities, audit and compliance systems, and the like.

According to the disclosed embodiments, the detector container 315 is configured to receive an event indicating that a base image (not shown) in an image registry 330 has been changed or added. In another embodiment, such an event may be received from a CI system 340 when a new image based is created. The event includes at least a source of the image (e.g., a registry's network address or a check-in system) and an identifier of the base image to be checked. In some embodiment, the event be generated by the host device 310 when a new base image is uploaded to the host and/or when an image locally stored in the device 310 is modified.

As discussed above, the base image includes a plurality of image layers (e.g., the layers 215, FIG. 2), each of which is uniquely identified. An identifier of an image layer may be a check-sum over the contents of the layer or a hash value computed using a predefined hash function.

In an embodiment, upon receiving an event, it is checked if any layer of the base image was previously scanned. If no layer of the base image was previously scanned, it is determined that the base image requires scanning. A base image that requires scanning is exported to the host device 310 (an example for such a base image is shown as 312 in FIG. 3).

In an embodiment, the detector container 315 is configured to reformat the base image 312 into a data structure that can be processed. For example, the data structure may be reformatted to be, but is not limited to, a file having a standard format, a TAR (Tape ARchive) file, and the like. In another embodiment, the software container 315 is configured to create a container filesystem (e.g., using a Docker platform) for the base image 312. The filesystem is created without executing the base image 312 or the created file system.

Specifically, a software container is created using the base image 312. However, the detector container 315 does not execute any of the binaries that the base image 312 contains within the newly created software container. Rather, the detector container 315 is configured to execute a scanning process for scanning the filesystem and evaluating the security state of the based image 312 as discussed herein.

It should be noted that reformatting or creating a filesystem for the base image 312 includes extracting the structured layers of the base image 312. The extracted contents of the base image 312 can be scanned, parsed, or otherwise processed. In an embodiment, when the base image 312 is extracted, the software container 315 is configured to start scanning the contents of the base image 312 to detect vulnerabilities.

Specifically, according to some embodiments, the vulnerability scanning includes the identification of vulnerabilities in at least software packages, software libraries, as well as known and zero-day malwares. To identity a vulnerable software package installed within a base image, a version identifier of each software package is determined. Then, the version identifier is compared to a list of known vulnerabilities associated with specific package versions. If there is a match, the package is determined as vulnerable. For example, an openssl package with a version lower than 1.0.1e-2+deb7u5 is known to be vulnerable (CVE-2014-0160 heartbleed vulnerability). Thus, if the base image 312 includes such an openssl package, the package is determined to be vulnerable.

To identity a vulnerable software library installed in the base image 312, a version identifier of each package is then determined. Then, the version identifier is compared to a list of known vulnerabilities associated with specific libraries versions. If there is a match, the library is determined as vulnerable. The software libraries may include third party software libraries, such as public JAR (Java), Gems (Ruby), Python, Node.js, and the like. Vulnerabilities to be scanned for may include, but are not limited to, vulnerable packages per Linux® or Windows® distribution, vulnerable packages for third party packaging systems (e.g., NPM, Ruby Gems, Python packaging/PIP, and Java JARs), vulnerable binary programs, and malware within executable files (e.g., binary and shell scripts). A vulnerable binary program may be, for example, a copy of "java.exe" with a known common vulnerability and exposure (i.e., as opposed to installing it as a package).

The identification of known or zero-day malware is based on the received intelligence information from the intelligence system 360. As an example, the extracted contents of the base image 312 are inspected to check a signature of a malware is contained therein. As intelligence information is provided in part from CVE databases, the file scanning provides a defense against zero-day attacks and vulnerability in real-time as the files are detected. A malware may include computer viruses, worms, Trojan horses, ransomware, spyware, adware, scareware, and other programs or processes executing malicious code.

Upon detection of a vulnerability, a detection event is generated and reported. Such a detection event may include, but is not limited to, a base image identifier, an infected layer or layers, a source register, a type of the detected vulnerability, and so on. The identifier of a malicious base image is saved in the database 350.

When no vulnerability is detected, the detector container 315 is configured to generate a unitary signature for each image layer and preferably for the entire base image 312. The unitary signature may be a check-sum of a layer, a hash function computed over the contents of the layer, and so on. The unitary signatures for each layer are saved in the database 350 to determine if repeated scanning of the base image 312 or any equivalent image is required. In another embodiment, the unitary signatures are used to determine if repeated scanning of specific layer equivalent to previously scanned layer is required. As layers can be shared among base images, skipping the scanning of previously scanned layers optimize the detection process.

As noted above, an event indicating that a base image should be scanned may be received from a CI system 340. According to this embodiment, when a respective base image (e.g., the base image 312) is determined to be safe, the base image is returned to the CI system's pipeline for further processing. Otherwise, when the base image is malicious, the CI system 340 is instructed to stop the integration process.

In an embodiment, when an event indicating that a base image should be scanned is received, the detector container 315 is configured to export the base image and to check if there are any unitary signatures saved in the database 350 for the base image. If so, a unitary signature is computed for each layer in the base image requested to be scanned. The computed unitary signatures are matched to those saved in the database 350. If the compared unitary signatures are the same, then the base image is determined to be safe and is not scanned again. Otherwise, the base image is scanned as discussed in detailed herein above.

Figure 4A:
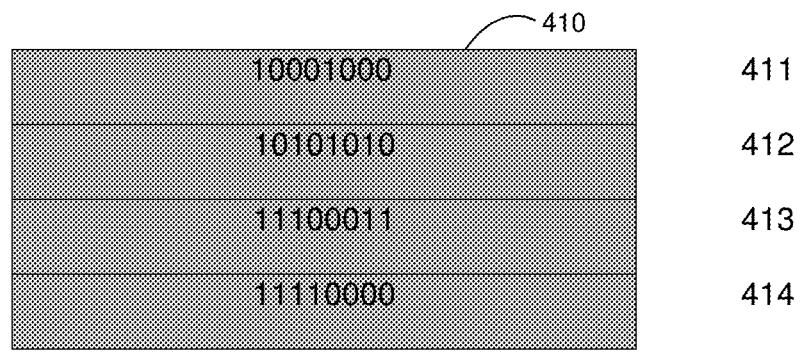
FIGS. 4A through 4C show exemplary base images and unitary signatures generated to determine if scanning is required according to an embodiment.
Figure 4B:
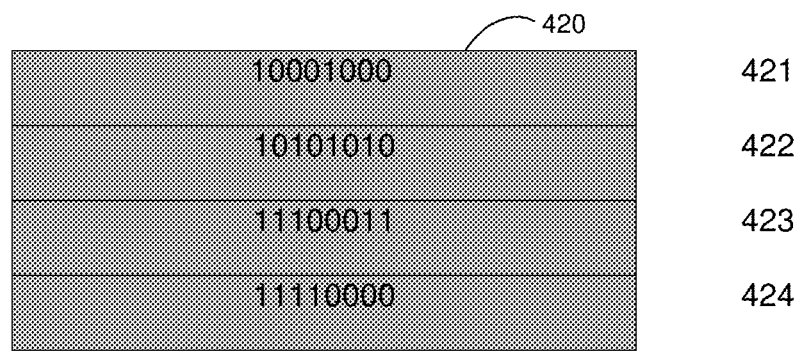
Figure 4C:
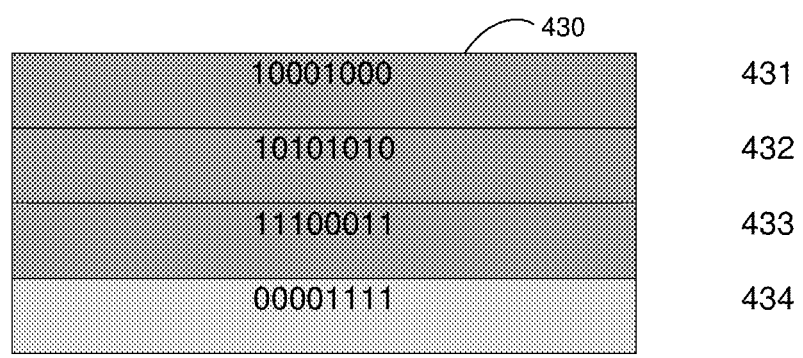

This process is further demonstrated in FIGS. 4A, 4B, and 4C of base images 410, 420, and 430 respectively. The base image 410 has been scanned for vulnerabilities and found safe. The unitary signatures generated for its layers 411 through 414 are "10001000", "10101010", 11100011", and "11110000", respectively. An event indicating that the base image 420 should be scanned is received. Unitary signatures are computed for each of the layers 421 through 424. Such unitary signatures are "10001000", "10101010", 11100011", and "11110000", respectively. The unitary signatures of the layers 421 through 424 are compared to the unitary signatures of the layers 411 through 414, respectively. As the contents (and thus the signatures) of both images 410 and 420 are the same, the base image 420 is not scanned, but determined as safe.

An event indicating that the base image 430 should be scanned is received. The unitary signatures are computed for each of the layers 431 through 434. Such signatures are "10001000", "10101010", 11100011", and "00001111", respectively. The unitary signatures of layers 431 through 434 are compared to the unitary signatures of layers 411 through 414, respectively. As the contents (and thus the signature) of the layer 434 are not the same of as those of the layer 414 of the base image 410, the base image 430 or only the layer in difference (e.g., layer 434) is scanned, or otherwise determined as unsafe.

Returning to back FIG. 3, the embodiments disclosed herein are not limited to the specific architecture illustrated in FIG. 3 and other architectures may be used without departing from the scope of the disclosed embodiments. Specifically, in an embodiment, there may be a plurality of detector containers 315 operating as described hereinabove and configured to either have one as a standby, to share loads between them, or to split the functions between them. In additional, other software containers or processes that handle the management and configuration the detector container 315 may be hosted in the device 310. Examples for such software containers or processes may include a Docker engine, a networking container, drivers, and so on. In another embodiment the detector container 315 may be hosted in the CI system 340 or any image register 330.

Furthermore, the detector container 315 can be realized as a software container. A software container provides an executable environment with a complete filesystem. A software container may include a micro-service, a Docker container, a light virtual machine, and the like.

Figure 5:
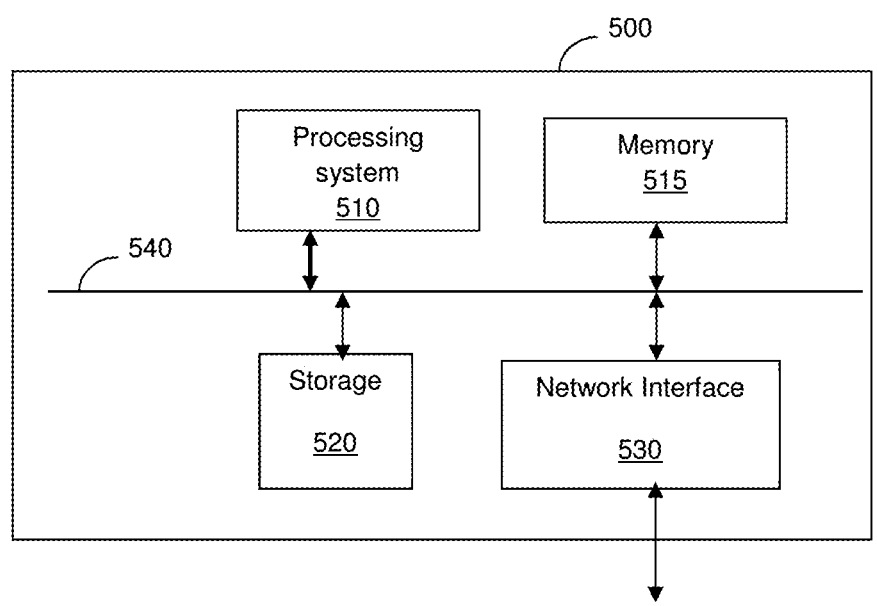
FIG. 5 is a block diagram of a hardware layer in host devices utilized to execute at least a detector container and a console container according to an embodiment.

It should be appreciated that each the host device 310 requires an underlying hardware layer to execute the OS, VMs, and software containers. An example block diagram of a hardware layer 500 is shown in FIG. 5. The hardware layer 500 includes a processing system 510, a memory 515, a storage 520, and a network interface 530, all connected to a computer bus 540.

The processing system 510 may be realized by one or more hardware logic components and circuits. For example, and without limitation, illustrative types of hardware logic components that can be used include Field Programmable Gate Arrays (FPGAs), Application-specific Integrated Circuits (ASICs), System-on-a-chip systems (SOCs), Complex Programmable Logic Devices (CPLDs), general-purpose microprocessors, microcontrollers, digital signal processors (DSPs), and the like, or any other hardware logic components that can perform calculations or other manipulations of information. The memory 515 may be volatile, non-volatile, or a combination thereof. The storage 520 may be magnetic storage, optical storage, and the like.

In one configuration, computer readable instructions to implement one or more embodiments disclosed herein may be stored in the storage 520. The storage 520 may also store other computer readable instructions to implement an operating system, an application program, and the like. Computer readable instructions may be loaded in the memory for execution by the processing system 510.

In another embodiment, the storage 520, the memory 515, or both, are configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system 510 to perform the various functions described herein with respect to at least detection of vulnerabilities.

The network interface 530 allows communication with other external systems or host devices through a network (e.g., the network 320). The network interface 530 may include a wired connection or a wireless connection. The network interface 530 may transmit communication media, receive communication media, or both. The computer bus 540 may be, for example, a PCIe bus.

Figure 6:
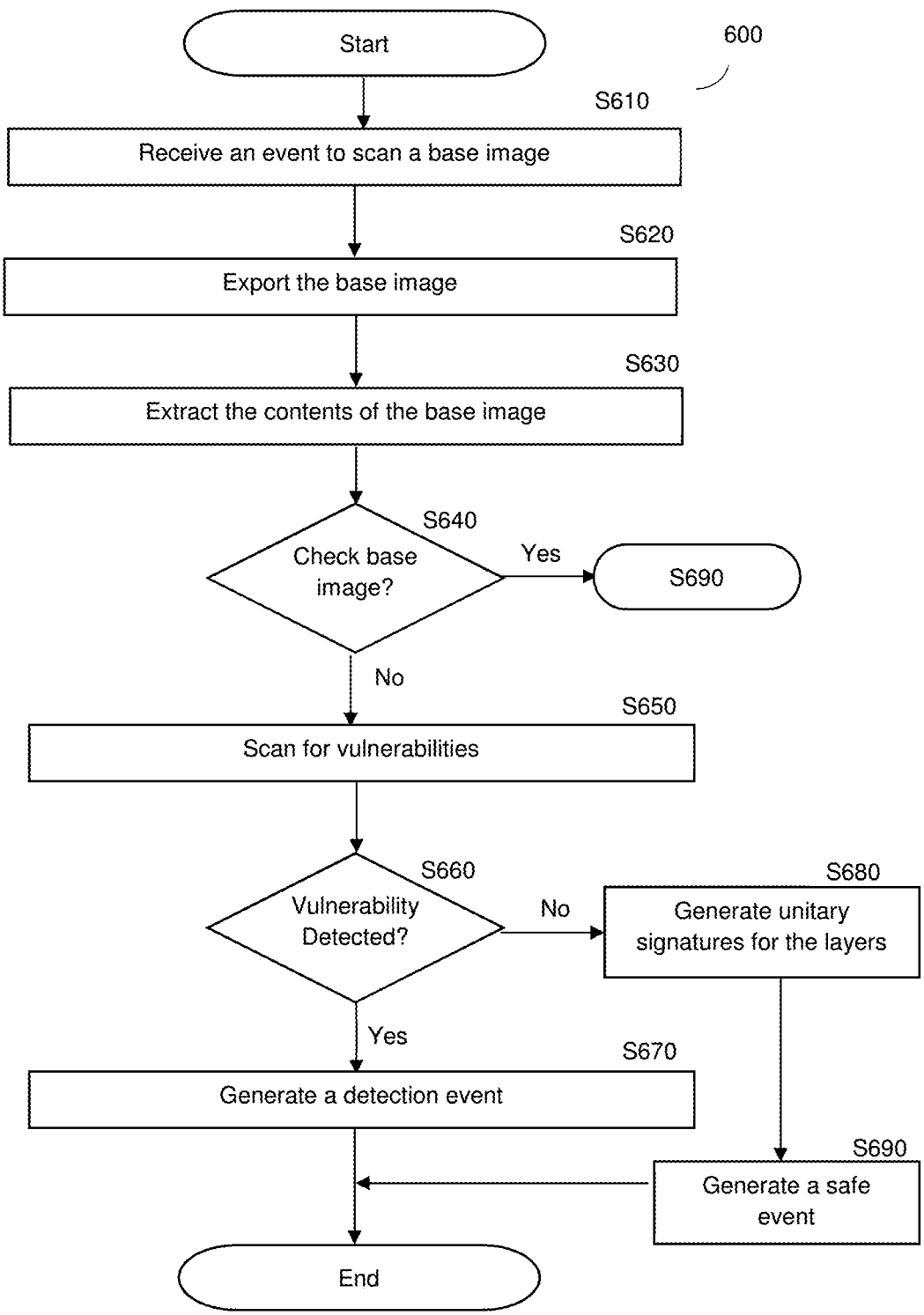
FIG. 6 is a flowchart illustrating a method for detecting vulnerabilities in base images software containers according to an embodiment.

FIG. 6 shows an example flowchart 600 illustrating a method for detection of vulnerabilities in base images of software containers according to an embodiment. The detection is performed prior to integration of a base image in a software container and, therefore, prior to running the software container.

At S610, an event indicating that a base image should be scanned is received. Such an event can be received from a continuous integration system, an image registry, and the like. The event may designate a specific base image or a group of base images (each of which identified by their unique identifier) and the source of the image(s) to be scanned. For sake of simplicity of the discussion, the example flowchart 600 is discussed with respect to receiving a single event. It should be noted that additional events may be received without departing from the scope of the disclosure.

At S620, the base image to be scanned is exported from its source to the device hosting the detector container. It should be emphasized that exporting the base image does not require executing the image on the host device.

At S630, the contents of the exported base image are extracted. Specifically, the contents of each layer in the base image may be extracted. In an embodiment, the extraction includes reformatting the base image into a data structure that can be processed. For example, before reformatting, the data structure may include, but is not limited to, a file having a standard format (e.g., a TAR file), a filesystem structure, and the like. In an example embodiment, reformatting the base image into a filesystem structure includes creating a container filesystem (e.g., using a Docker platform) for the base image 312.

At S640, it is checked if the exported base image should be scanned for vulnerabilities. If so, execution continues with S650; otherwise, execution continues with S690. The operation of S640 is discussed in more detail with reference to FIG. 7. At S690, a safe event indicating that the base image does not contain vulnerabilities is generated. Upon generation of a safe event, the base image can be safely added to the registry or to the continuous integration system.

At S650, the extracted contents are scanned for vulnerabilities. Such vulnerabilities may include previously known or newly discovered malware, or any modified version of previously known or newly discovered malware. Malware may include, for example, computer viruses, worms, Trojan horses, ransomware, spyware, adware, scareware, and other programs or processes executing malicious code.

In an embodiment, the scanning is performed based on intelligence information received from one or more intelligence systems (e.g., the intelligence systems 360). The intelligence information includes definitions of known vulnerabilities such as, but not limited to, signatures of viruses or worms, or any viruses, worms, spyware, or any type of malware. Thus, in an embodiment, the extracted contents of the file are inspected to determine if the file contains, for example, a signature of a known or newly discovered malware. In another embodiment, the scanning of the extracted contents is further based on one or more heuristics or behavior patterns of malicious programs. This allows for detection of known malware in any modified versions.

In an embodiment, S650 further includes scanning for vulnerabilities in software packages, libraries, or both, that are installed in the base image. To this end, an identifier of each such package or library is detected in the extracted contents. Each such identifier is compared against a list of vulnerable software packages or libraries. If any package or library identifier from the base image matches an identifier in such a list, the base image is determined to be vulnerable.

At S660, it is checked if any vulnerability was detected during the scanning process and, if so, execution continues with S670; otherwise, execution continues with S680.

At S670, a detection event is generated. The detection event may be sent to the source of the base image, i.e., an image registry, a continuous integration system, or both. The detection event may designate, for example, a base image identifier, an infected layer or layers, a source register, a type of the detected vulnerability, and so on. The identifier of a malicious base image is saved in the database, reported to an external system, or both. The detection event may cause halting the continuous integration or uploaded of the base image.

At S680, when no vulnerability is detected, a unitary signature is generated for each image layer and, preferably, for the entire base image, and execution continues with S690. The unitary signature may be a check-sum of a layer, a hash function computed over the contents of the layer, and so on. The signatures are saved in the database to determine if additional scanning of the base image or any equivalent image is required. In an embodiment, S680 may include using the unitary signatures generated at S640 as described further herein below with respect to FIG. 7.

Figure 7:
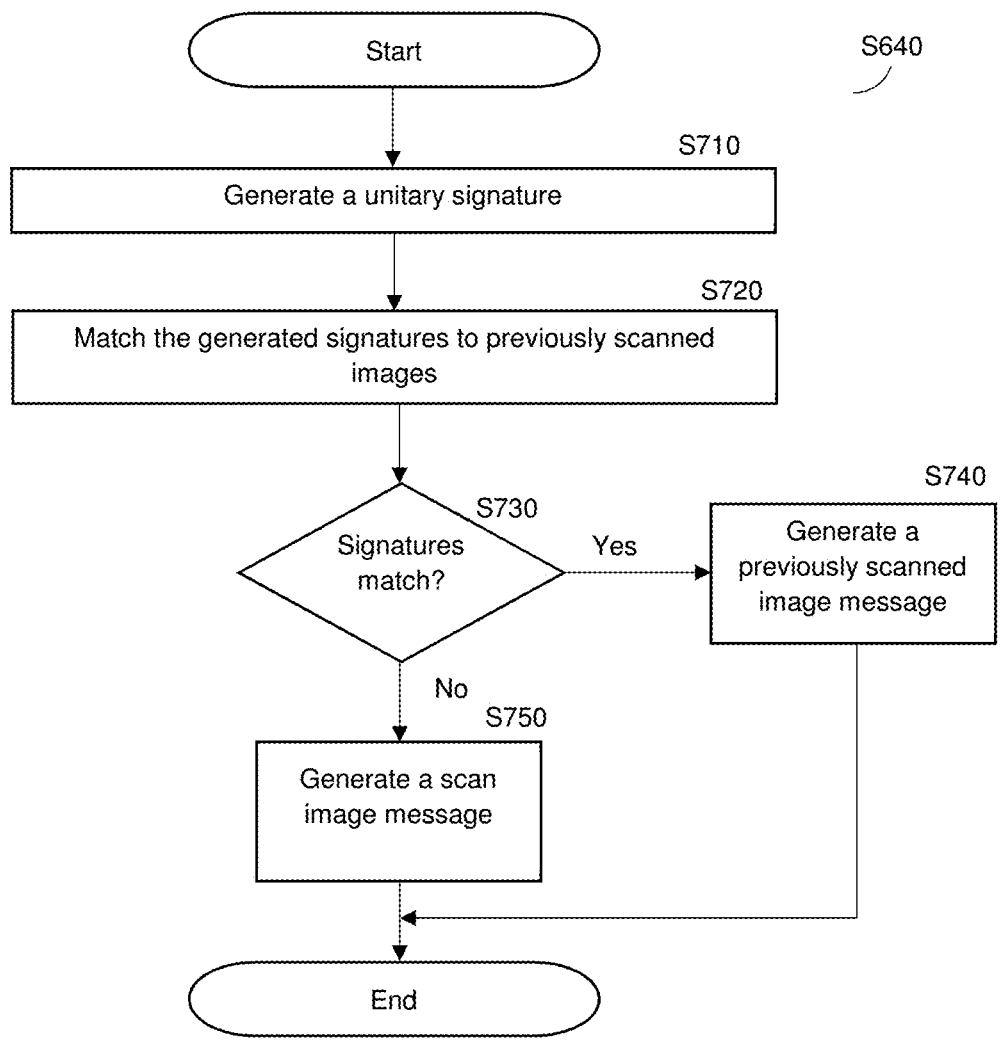
FIG. 7 is a flowchart illustrating a method for optimizing the vulnerability detection process according to an embodiment.

FIG. 7 shows an example flowchart S640 illustrating a process for determining if a vulnerability scan for an exported base image is required according to an embodiment. At S710, a unitary signature is generated for each image layer. In an embodiment, a unitary signature is also generated for the base image. As noted above, a unitary signature may be a check-sum of a layer, a hash function computed over the contents of the layer, and so on.

At S720, if is checked if the unitary signatures generated at S710 match unitary signatures of a base image or layers that were previously scanned for vulnerabilities. As noted above, unitary signatures of previously checked base images are saved in a database, e.g., the database 350. In an embodiment, the generated unitary signatures match the unitary signatures of the previously scanned base image if each generated unitary signature matches a corresponding unitary signature of the previously scanned base image. In an embodiment, the generated unitary signature matches the unitary signatures of the previously layer if the corresponding unitary signatures match.

At S730, it is determined if a match was found. If so, at S740, a message indicating that the exported base image or a specific layer was previously scanned is generated and returned. Otherwise, at S750, a message indicating that the exported base image or a specific layer within such image should be scanned is generated and returned.

In an embodiment, the methods discussed with references to FIGS. 6 and 7 are performed prior to execution any software container containing the base images. The methods may be performed by a detector container executed over a host device.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements. In addition, terminology of the form "at least one of A, B, or C" or "one or more of A, B, or C" or "at least one of the group consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for detecting vulnerabilities in base images of software containers, comprising:
    receiving an event indicating a plurality of base images to be scanned for vulnerabilities, each of the plurality of base images including at least one image layer, wherein the event designates at least one source of the plurality of base images, wherein the plurality of base images includes resources utilized to execute at least a software container;
    determining whether each of the plurality of base images was previously scanned, wherein determining whether each of the plurality of base images was previously scanned further comprises comparing unitary signatures generated for the plurality of base images to unitary signatures generated for at least one previously scanned base image, wherein each of the at least one previously scanned base image was previously determined to be safe;
    generating a safe event for each of the plurality of base images that was previously scanned;
    extracting contents of each image layer of each of the plurality of base images that was not previously scanned;
    scanning the extracted contents;
    generating a detection event, when the at least one vulnerability is detected during the scan; and
    generating a unitary signature for each image layer of each of the plurality of base images when no vulnerability is detected during the scan.

2. The method of claim 1, further comprising:
    exporting the at least one base image from the at least one source to a host device.

3. The method of claim 1, wherein extracting the contents of the each image layer of a base image further comprises:
    reformatting the at least one base image into a data structure, wherein the data structure is a file having a standard format.

4. The method of claim 1, wherein the at least one vulnerability includes at least any one of: malware, and a vulnerable software library installed in the at least one base image.

5. The method of claim 1, wherein scanning to identify at least malware further comprises:
    receiving intelligence information, wherein the intelligence information includes at least definitions of malwares; and
    scanning the extracted contents to identify at least one definition of the at least one type of malware defined in the intelligence information.

6. The method of claim 5, wherein scanning to identify a vulnerable software library installed in the at least one base image further comprises:
    determining an identifier of each software library installed in the at least one base image; and
    comparing each determined identifier against a list of vulnerable software libraries.

7. The method of claim 5, wherein scanning to identify a vulnerable software package installed in the at least one base image further comprises:
    determining an identifier of each software package installed in the at least one base image; and
    comparing each determined identifier against a list of vulnerable software packages.

8. The method of claim 1, wherein the generating the detection event further comprises:
    halting a process of updating the source with the least one base image.

9. The method of claim 1, wherein extracting the contents of each image layer of a base image further comprises:
    extracting a plurality of structured layers of each of the at least one base image; and
    creating a container filesystem for each of the at least one base image based on the extracted plurality of structured layers of the base image.

10. The method of claim 1, wherein the plurality of base images that should be scanned for vulnerabilities is a plurality of first base images, further comprising:
    scanning a plurality of second base images for vulnerabilities; and
    generating a safe event for each of the plurality of second base images that does not contain vulnerabilities, wherein the each of the at least one previously scanned base image is one of the plurality of second base images for which a safe event is generated.

11. A system for detecting vulnerabilities in software containers at runtime, comprising:
    a processing system; and
    a memory, the memory containing instructions that, when executed by the processing system, configure the system to:
        receive an event indicating that a plurality of base images should be scanned for vulnerabilities, each of the plurality of base images including at least one image layer, wherein the event designates at least one source of the plurality of base images, wherein the least one base image includes resources utilized to execute at least a software container;
        determine whether each of the plurality of base images was previously scanned, wherein determining whether each of the plurality of base images was previously scanned further comprises comparing unitary signatures generated for the plurality of base images to unitary signatures generated for at least one previously scanned base image, wherein each of the at least one previously scanned base image was previously determined to be safe;

extract contents of each image layer of the each of the plurality of base images that was not previously scanned;

scan the extracted contents;

generate a detection event, when at least one vulnerability is detected is detected during the scan; and generate a unitary signature for each image layer of each of the plurality of base images when no vulnerability is detected during the scan.

12. The system of claim 11, wherein the system is further configured to:

export the at least one base image from the at least one source to a host device.

13. The system of claim 11, wherein the system is further configured to:

reformat the at least one base image into a data structure, wherein the data structure is a file having a standard format.

14. The system of claim 11, wherein the at least one vulnerability includes at least any one of: malware, and a vulnerable software library installed in the at least one base image.

15. The system of claim 11, wherein the system is further configured to:

receive intelligence information, wherein the intelligence information includes at least definitions of malwares; and scan the extracted contents to identify at least one definition of the at least one type of malware defined in the intelligence information.

16. The system of claim 15, wherein the system is further configured to:

determine an identifier of each software library installed in the at least one base image; and compare each determined identifier against a list of vulnerable software libraries.

17. The system of claim 16, wherein the system is further configured to:

determine an identifier of each software package installed in the at least one base image; and compare each determined identifier against a list of vulnerable software packages.

18. The system of claim 11, wherein the system is further configured to:

halt a process of updating the source with the least one base image.

19. A non-transitory computer readable medium having stored thereon instructions for causing a processing system to execute a process for detecting vulnerabilities in software containers at runtime, the process comprising:

receiving an event indicating that a plurality of base images should be scanned for vulnerabilities, each of the plurality of base images including at least one image layer, wherein the event designates at least one source of the plurality of base images, wherein the plurality of base images includes resources utilized to execute at least a software container;

determining whether each of the plurality of base images was previously scanned, wherein determining whether each of the plurality of base images was previously scanned further comprises comparing unitary signatures generated for the plurality of base images to unitary signatures generated for at least one previously scanned base image, wherein each of the at least one previously scanned base image was previously determined to be safe;

generating a safe event for each of the plurality of base images that was previously scanned;

extracting contents of each image layer of each of the plurality of base images that was not previously scanned;

scanning the extracted contents;

generating a detection event, when the at least one vulnerability is detected during the scan; and generating a unitary signature for each image layer of each of the plurality of base images when no vulnerability is detected during the scan.

* * * * *